United States Patent [19]

Tsuchida et al.

[11] Patent Number: 4,815,570
[45] Date of Patent: Mar. 28, 1989

[54] ACCELERATION SENSOR FOR VEHICLE WHEEL BRAKING ANTI-LOCK CONTROLLER

[75] Inventors: Tetsuo Tsuchida; Yoshinori Yamanoi, both of Saitama, Japan

[73] Assignee: Honda Giken Kogyo Kabushiki Kaisha, Tokyo, Japan

[21] Appl. No.: 111,668

[22] Filed: Oct. 23, 1987

[30] Foreign Application Priority Data

Oct. 24, 1986 [JP] Japan .................................. 61-253464

[51] Int. Cl.$^4$ ............................................ B60T 13/06
[52] U.S. Cl. ................................................. 188/181 A
[58] Field of Search ...................... 188/181 A, 181 R; 303/112, 113, 116

[56] References Cited

U.S. PATENT DOCUMENTS

| 4,602,705 | 7/1986 | Farr et al. | 303/181 A |
|---|---|---|---|
| 4,730,705 | 3/1988 | Farr | 303/181 A |
| 4,733,757 | 3/1988 | Hayashi et al. | 188/181 A |
| 4,745,994 | 5/1988 | Tsuchida | 188/181 A |

FOREIGN PATENT DOCUMENTS

| 0177310 | 4/1986 | European Pat. Off. |
| 0256703 | 2/1988 | European Pat. Off. |
| 1040771 | 9/1966 | United Kingdom |
| 2109494 | 6/1983 | United Kingdom |

Primary Examiner—Duane A. Reger
Attorney, Agent, or Firm—Lyon & Lyon

[57] ABSTRACT

A controller for a hydraulically operated braking system incorporates a flywheel apparatus arranged to sense the onset of a wheel-locking condition and to effectively control the operation of the braking system so as to prevent the occurrence of the wheel-locking condition. The flywheel is rotatably, and axially movably, supported with respect to an output shaft of the system in spaced relation therefrom so as to eliminate the effects of friction forces on system operation.

14 Claims, 7 Drawing Sheets

ACCELERATION SENSOR FOR VEHICLE WHEEL BRAKING ANTI-LOCK CONTROLLER

BACKGROUND OF THE INVENTION

This invention relates to a wheel angular acceleration sensor for vehicle anti-lock controllers. More specifically, the invention relates to an improved form of wheel angular acceleration sensor which comprises an output shaft coupled to, and rotating with, the wheel that is braked by the wheel brake; a flywheel rotatably mounted and axially displaceable on the output shaft; a clutch means disposed between the output shaft and the flywheel and adapted to transmit the driving torque of the output shaft to the flywheel under normal operating conditions and, when the vehicle wheel approaches a locked condition during braking, to allow the flywheel to overrun the output shaft; and a cam mechanism cooperable with the clutch means between the output shaft and the flywheel to give the flywheel an axial displacement in response to the overrunning rotation of the flywheel, the axial displacement of the flywheel being operative in the control of the braking of the vehicle wheel.

Wheel angular acceleration sensors of the involved type are known, one such sensor device being described in Japanese Laid-Open Publication No. 126241/1983. In such conventional wheel angular acceleration sensors, the flywheel is directly rotatably and axially slidably supported on the output shaft and, thus, is subject to friction resistance between it and the output shaft. Further, the friction resistance varies even with small changes in the lubricated condition of the organization, such that it is difficult to stabilize the axial displacement characteristics of the flywheel with respect to the thrust force produced by the cam mechanism.

The present invention seeks to overcome the above problem and has as a principal object to provide a wheel angular acceleration sensor within which the flywheel is supported with respect to the output shaft without any physical contact occurring between the flywheel and the output shaft to obtain stable axial displacement characteristics of the flywheel.

SUMMARY OF THE INVENTION

According to the present invention there is provided a wheel angular acceleration sensor for a vehicle wheel braking anti-lock controller comprising wheel braking means; an output shaft having an axis and rotatable with the wheel that is braked; a flywheel disposed around the output shaft with a spacing therebetween so as to be rotatable around and movable along the axis of the output shaft; clutch means for transmitting driving torque from the output shaft to the flywheel under normal operating conditions and for permitting relative angular movement between the flywheel and the output shaft during periods of wheel deceleration due to braking; a cam mechanism operative to move the flywheel axially of the output shaft in response to relative angular movement therebetween; and means responsive to the flywheel axial movement for controlling the wheel braking means, characterized in that the cam mechanism comprises a drive cam plate rotatably mounted on the output shaft and driven by it through the clutch means; and a follower cam plate formed integral with the flywheel and disposed opposite in face-to-face relationship to the drive cam plate; and in that the flywheel is supported by the cam mechanism with respect to the output shaft in such a manner that there is no contact between the flywheel and the output shaft.

Since, with the above structure, the flywheel is not subject to any friction resistance, it is possible to effect a correct axial displacement of the flywheel in response to the thrust force generated by the cam mechanism without necessity to lubricate the flywheel and the output shaft.

For a better understanding of the invention, its operating advantages and the specific objectives obtained by its use, reference should be made to the accompanying drawings and description which relate to a preferred embodiment thereof.

DETAILED DESCRIPTION OF THE PREFERRED EMBODIMENT

Figure 1:
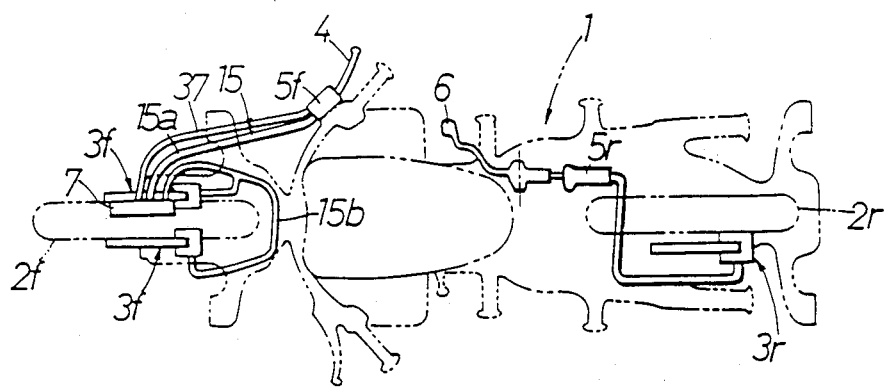
FIG. 1 is a somewhat schematic plan view of a motorcycle which has a braking apparatus equipped with an anti-lock controller.

The motorcycle 1 as shown in FIG. 1 has a pair of front wheel brakes 3f, 3f on each side of the front wheel 2f and a rear wheel brake 3r on the rear wheel 2r. The front wheel brakes 3f, 3f are operated by hydraulic pressure produced by the front master cylinder 5f operated by the brake lever 4. The rear wheel brake 3r is operated by hydraulic pressure produced by the rear master cylinder 5r operated by brake pedal 6. The hydraulic braking pressure of the front wheel brakes 3f, 3f is controlled by the anti-lock controller 7.

Figure 2:
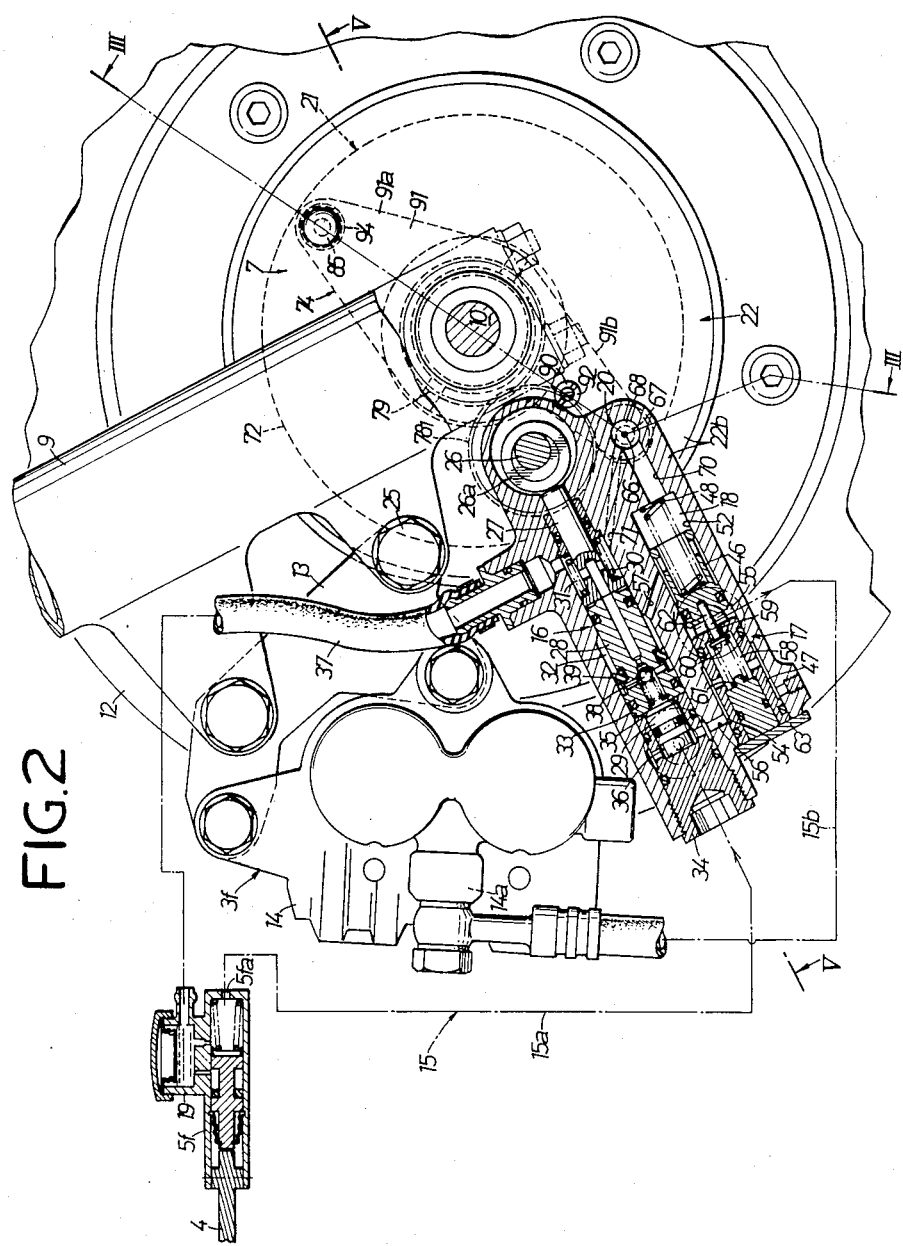
FIG. 2 is a vertical cross section showing an essential part of the braking apparatus with the anti-lock controller.
Figure 3:
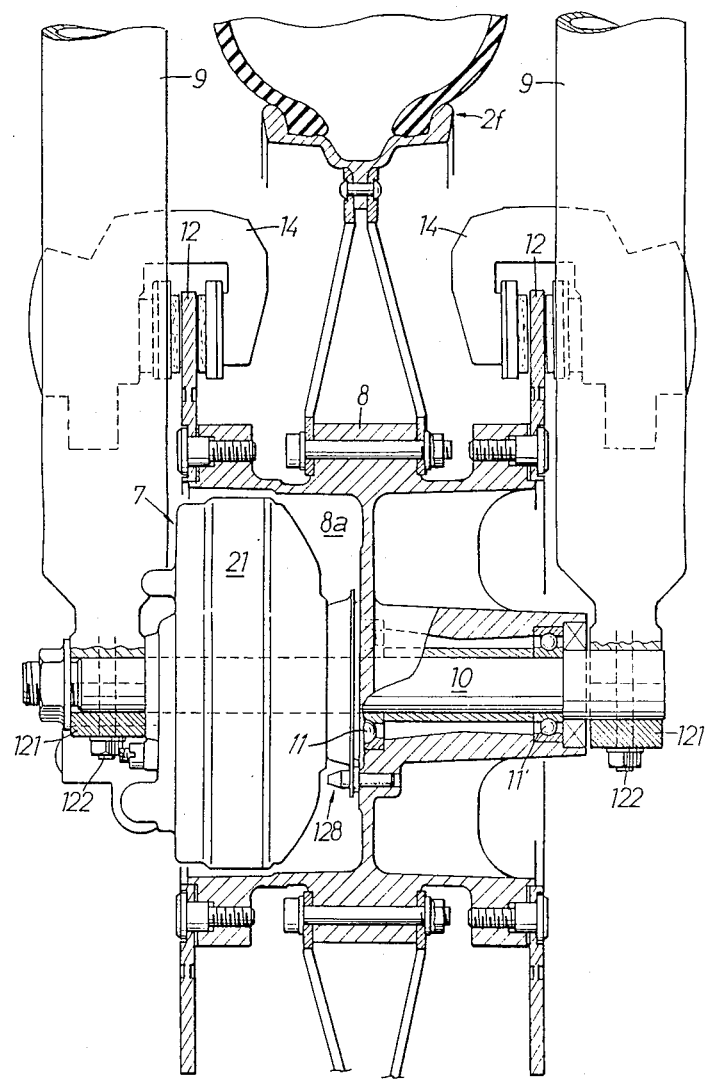
FIG. 3 is an enlarged vertical cross section showing a motorcycle wheel incorporating the anti-lock controller of FIG. 2.

Referring to FIGS. 2 and 3, the hub 8 of the front wheel 2f is rotatably supported on the axle 10 through a pair of bearings 11, 11'. The axle 10 has its opposite ends removably secured to the lower ends of the front forks 9 by holders 121 and bolt and nut connections 122. Each of the front brakes 3f, 3f comprises a brake disk 12 secured to the end surface of the hub 8 and a brake caliper 14 disposed astride the brake disk 12 and supported on the front fork 9 through a bracket 13. The brake caliper 14, when output hydraulic pressure is supplied to its input port 14a from the front master cylinder 5f, is operated to grip the brake disk 12 applying a brake force to the front wheel 2f.

An anti-lock controller 7 is installed in the hydraulic pipe 15 which serves as a brake oil path connecting the output port 5fa of the front master cylinder 5f and the input port 14a of each brake caliper 14.

Figure 5:
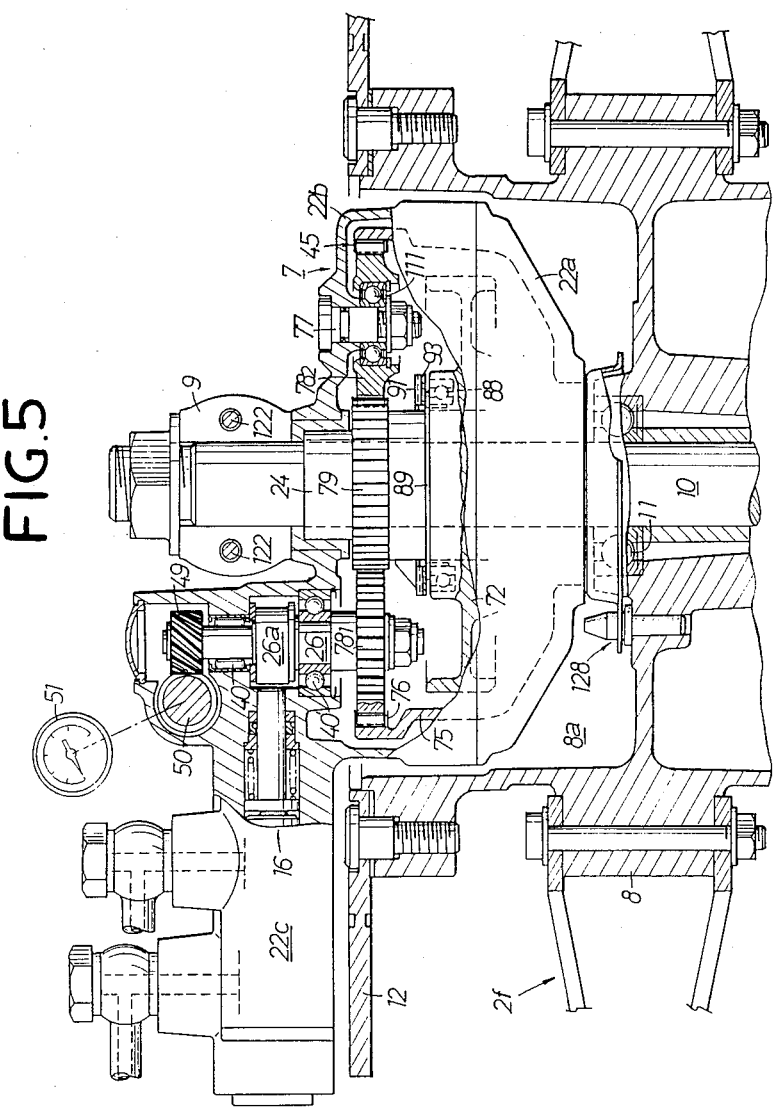
FIG. 5 is a cross section taken along line V—V of FIG. 2.

The anti-lock controller 7, as shown in FIGS. 2 and 5, mainly comprises a hydraulic pump 16 that is operated at the time of braking; a modulator 17 that has a control oil chamber 18 to which the output pressure from the pump 16 is introduced and that is interposed in the intermediate portion of the hydraulic pipe 15; a normally closed pressure discharge valve 20 installed in a communicating path between the control oil chamber 18 and an oil reservoir 19; and an intertia type wheel angular acceleration sensor 21 which detects an angular deceleration of the front wheel 2f greater than a specified value to close the pressure discharge valve 20. All of the components of the anti-lock controller 7 are contained in a casing 22.

The casing 22 is made in a manner that open ends of a cup-shaped inner case 22a and an outer case 22b are threadedly connected together. An extension 22c extending radially outwardly is formed integral with the end wall of the outer case 22b. The casing 22 is disposed, except for the extension 22c, so as to be contained in a recess 8a formed on the left end surface of the hub 8. The outer casing 22b is supported at the center of its end wall by the left end of the hollow cylindrical shaft 24 that encloses the axle 10 and is also connected to the front fork 9 through a rotation prevention device to keep the outer casing 22b from being rotated around the axle 10. The rotation prevention device may, for instance, be a bolt 25 to fix the bracket 13 to the front fork 9 (see FIG. 2).

The hydraulic pump 16 comprises a cam shaft 26 disposed parallel to the axle 10; a push rod 27 with its inner end opposing the eccentric cam 26a formed on the cam shaft 26; a pump piston 28 in contact with the outer end of the push rod 27; a working piston 29 in contact with the outer end of the pump piston 28; and a return spring 30 urging the push rod 27 in a direction to move away from the eccentric cam 26a.

The push rod 27 and the pump piston 28 are slidably mounted in the first cylinder bore 33 formed in the extension 22c, thereby defining an inlet chamber 31 and an outlet chamber 32 on the outer circumference of the rod 27 and piston 28. The first cylinder bore 33 has a plug member 34 fitted at the outer end to form a pump chamber 35 between it and the pump piston 28. The working piston 29 is in sliding contact with the plug member 34 so as to define a pressure oil chamber 36.

The inlet chamber 31 communicates with the reservoir 19 through the pipe 37 and also with the pump chamber 35 through the suction valve 38. The pump chamber 35 communicates with the outlet chamber 32 through a one-way sealing member 39. The pressure oil chamber 36 is connected to the upstream pipe 15a of the oil pipe 15 so that the chamber 36 communicates at all times with the output port 5fa of the front master cylinder 5f.

As shown in FIG. 5, the cam shaft 26 is supported by the end wall of the outer case 22b through bearings 40, 40' and is driven by the front wheel 2f through a speed increasing device 45, or a power transmission device, which is described hereinafter. The cam shaft 26 also has a meter drive gear 49 secured at its outer end, the gear 49 being in mesh with a follower gear 50 which is coupled to the input shaft of the speed meter 51 of the motorcycle.

The modulator 17 comprises a pressure reducing piston 46; a stationary piston 47 that receives one end of the pressure reducing piston 46 to restrict its retracting motion; and a return spring 48 that urges the pressure reducing piston 46 in a direction to abut the stationary piston 47. These two pistons 46, 47 are slidable in a second cylinder bore 52 formed adjacent to the first cylinder bore 33.

In the second cylinder bore 52, the pressure reducing piston 46 defines a control oil chamber 18 between the piston 46 and the inner end wall of the second cylinder bore 52 and also defines an output oil chamber 55 between the piston 46 and the stationary piston 47. The stationary piston 47 forms an output oil chamber 54 around its circumference. The input oil chamber 54 communicates with the pressure oil chamber 36 of the hydraulic pump 16 through an oil path 56. The output oil chamber is connected to the downstream pipe 15b of the hydraulic pipe 15 so as to communicate with the input port 14a of the front wheel brakes 3f, 3f at all times. The control oil chamber 18 is connected to the outlet chamber 32 of the hydraulic pump 16 through an oil path 57.

The stationary piston 47 has a valve member 58 communicating at all times with the input oil chamber 54 and also a valve hole 59 to allow the valve chamber 58 to communicate with the output oil chamber 55. Installed in the valve chamber 58 are a valve body 60 to open and close the valve hole 59 and a valve spring 61 to urge the valve body 60 toward the closing direction. The valve body 60 has a valve opening rod 62 projecting on one end surface of the pressure reducing piston 46 to open the valve body 60. The valve opening rod 62 keeps the valve body 60 open when the pressure reducing piston 46 is at the retracted position.

The second cylinder bore 52 is closed at the outer opening by the end plate 63 secured to the extension 22c. The stationary piston 47 is kept in contact with the end plate 63 by the resilient force of the return spring 48 or by the oil pressure introduced into the oil input and output chambers 54, 55.

The hydraulic pump 16 and the modulator 17, like the brake caliper 14, are disposed at the back of the front fork 9.

The pressure discharge valve 20 comprises a valve seat member 65 fitted in the stepped cylinder bore 64 of the outer case 22b and a valve disk 67 slidably disposed in the valve seat member 65 to open and close the valve hole 66. The valve seat member 65 defines an inlet chamber 68 in the small diameter portion of the stepped cylinder bore 64 and also an outlet chamber 69 in the large diameter portion. These inlet and outlet chambers 68, 69 communicate with each other through the valve hole 66. The inlet chamber 68 is connected to control chamber 18 through an oil path 70; and the outlet chamber 69 is connected to the inlet chamber 31 of the hydraulic pump 16 through an oil path 71 and thus further connected to the oil reservoir 19.

The wheel angular acceleration sensor 21 comprises a flywheel 72 driven by the front wheel 2f through a speed increasing device 45; a cam mechanism 73 to convert the overrunning rotation of the flywheel 72 into axial displacement; and an output lever mechanism 74 to operate the pressure discharge valve 20 according to the axial displacement of the flywheel 72. All of these are disposed in the casing 22.

The speed increasing device comprises a cup-shaped input member 75 disposed in the casing 22 with its open end directed toward the outer case 22b; a ring gear 76 formed at the open end of the input member 75; a first planetary gear $78_1$ secured to the inner end of the cam shaft 26 and meshed with the planetary ring gear 76; one or more secondary planetary gears $78_2$ supported through bearing 111 on a shaft 77 projecting on the end wall of the outer case 22b and meshed with the planetary ring gear 76; a sun gear 79 in simultaneous meshing engagement with the first and second planetary gears $78_1$, $78_2$; and an output shaft 42 splined to the sun gear 79 and rotatably supported on the cylindrical hollow shaft 24.

The second planetary gear $78_2$ cooperates with the first planetary gear $78_1$ in meshing relation with the ring and sun gears 76, 79, respectively, to maintain concentricity between the ring gear 76 and the sun gear 79 and thereby assure correct transmitting action of the speed increasing device 45. If, on the other hand, the ring gear 75 and the sun gear 79 have sufficient rigidity, the second planetary gear may be omitted.

The input member 75 has at the center of the end wall a boss 75a formed integral therewith and projecting outwardly. The boss 75a is rotatably supported on the cylindrical shaft 24 through the bearing 123 and sealing member 124.

Secured by screw 120 to the end surface of the boss 75a is the inner circumference part of a joint plate 125 which has a plurality of engagement holes 126 cut along a circle in the outer circumference part. At locations corresponding to these engagement holes 126 a plurality of synthetic resin joint pins 127 are embedded in the end surface of the hub 8 of the front wheel 2f. As the cylindrical hollow shaft 24 is telescopically received on the axle 10, the joint pins 127 are fitted into engagement holes 126 on the joint plate 125 to couple the input member 75 with the hub 8. Hence, the joint plate 125 and the joint pins 127 cooperate to form a joint 128.

The joint pins 127 each have a tapered leading end to allow smooth insertion into the associated engagement hole 126. The joint pin 127 also serves as a shear pin which is severed when subjected to a rotating torque of more than a certain value.

The boss 75a of the input member 75 passes through the inner case 22a of the casing 22 with a sealing member 129 interposed therebetween to seal the casing 22. The provision of the sealing member 129 at this position minimizes the sliding speed of the lip part of the sealing member 129 thereby effectively prolonging its life.

The output shaft 42 comprises a small diameter end portion 42a splined to the sun gear 79; a large diameter end portion 42b on the opposite side of the small diameter end portion 42a; a shaft portion 42c connecting these end portions 42a, 42b; and a flange 42d extending radially outwardly from the outer end of the large diameter end portion 42b. The output shaft 42 is disposed so that the small diameter end portion 42a is directed to the outer case 22b. The shaft portion 42c and the large diameter end portion 42b are rotatably supported on the cylindrical shaft 24 through needle bearing 41 and ball bearing 131, respectively.

Around the shaft portion 42c is mounted the flywheel 72 which is coupled to the flange 42d through the cam mechanism 73, friction clutch plate 87 and center adjust plate 138.

Figure 4:
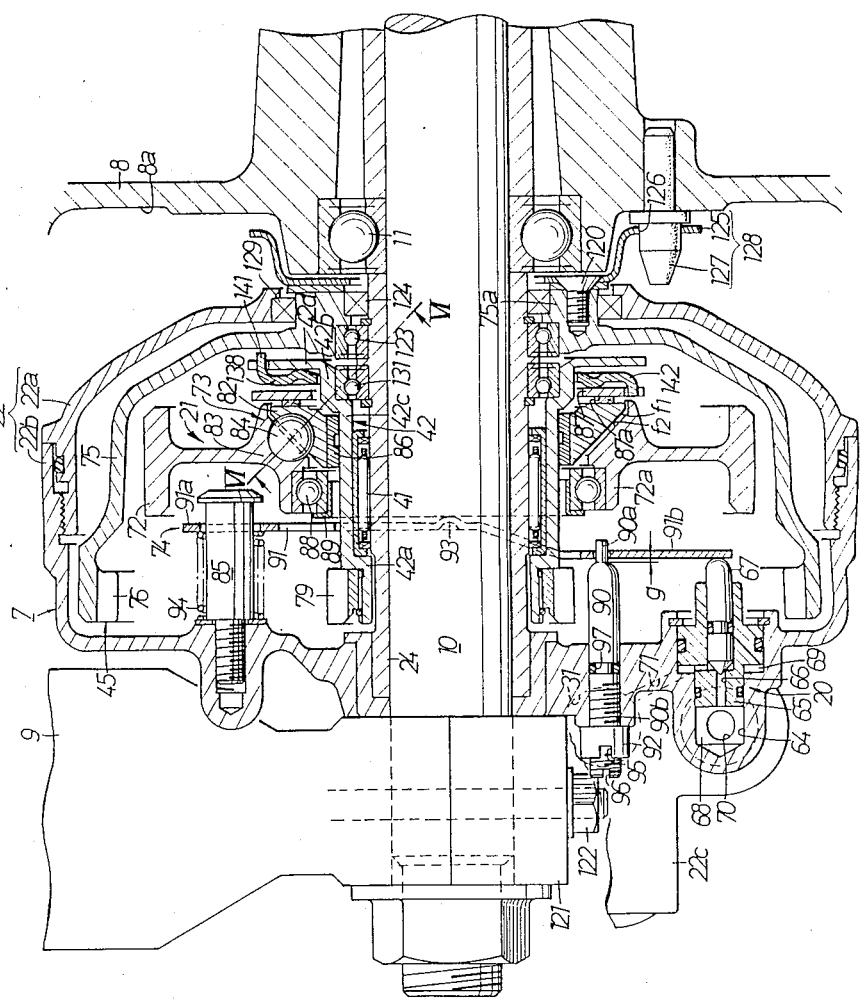
FIG. 4 is an enlarged vertical section of the anti-lock controller of FIG. 3.
Figure 6:
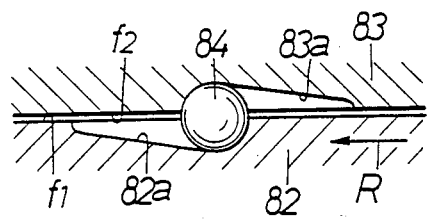
FIG. 6 is a cross-section taken along line VI—VI of FIG. 4.
Figure 7:
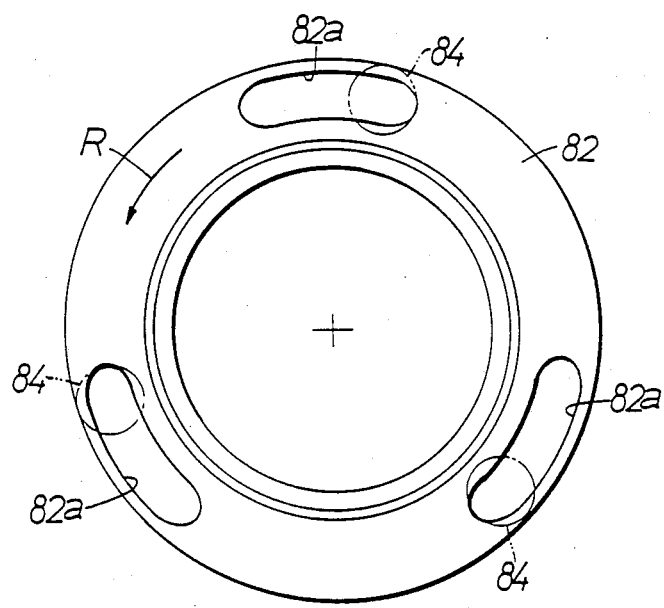
FIG. 7 is a plan view of the drive cam plate in the cam mechanism.

Referring now to FIGS. 4, 6, and 7, the cam mechanism 73 comprises a drive cam plate 82 rotatably supported on the output shaft 42 through the bearing bushing 86; a follower cam plate 83 formed integral with the flywheel 72 and disposed opposite to the drive cam plate 82; and a plurality of thrust balls 84 circumferentially arranged between these cam plates 82, 83.

The drive and follower cam plates 82, 83 have their opposing surfaces tapered in such a way that the taper surfaces $f_1$, $f_2$ increase their diameters toward the friction clutch plate 87. These tapered surfaces $f_1$, $f_2$ are formed with a plurality of cam recessed portions or grooves 82a, 83a in which the thrust balls 84 are installed.

The cam recessed portions 82a of the drive cam plate 82 have their bottoms inclined in such a manner that their depth decreases toward the rotating direction R of the drive shaft 42, while the cam recessed portions 83a of the follower cam plate 83 have their bottoms inclined so that the depth increases toward the direction of rotation R. Hence, in the normal case where the drive cam plate 82 drives the follower cam plate 83, the thrust balls 84 engage with the deepest part of the recessed portions 82a, 83a of the two cam plates 82, 83 transmitting the rotating torque the drive cam plate 82 receives from the drive shaft 42 to the follower cam plate 83, there being no relative rotation between the cam plates 82, 83. However, when, on the other hand, the follower cam plate 83 overruns the drive cam plate 82, a relative rotation occurs between the cam plates 82, 83 causing the thrust balls 83 to move along the inclined bottom surfaces of the cam recessed portions 82a, 83a. This, in turn, applies a thrust force to the cam plates 82, 83 axially displacing the follower cam plate 83 away from the drive cam plate 82.

The thrust balls 84 engaged in the cam recessed portions 82a, 83a formed on the taper surfaces $f_1$, $f_2$ of the drive and follower cam plates 82, 83 make it possible for the drive cam plate 82 to support the follower cam plate 83 in the thrust and radial directions, maintaining the flywheel 72 out of contact with the output shaft 42. It is, therefore, not necessary to provide lubrication between the output shaft 42 and the flywheel 72.

The friction clutch plate 87 is an annular member disposed around the large diameter end portion 42b of the output shaft 42. The friction clutch plate 87 has a friction lining 87a at its side that engages with the back of the drive cam plate 82.

Figure 8:
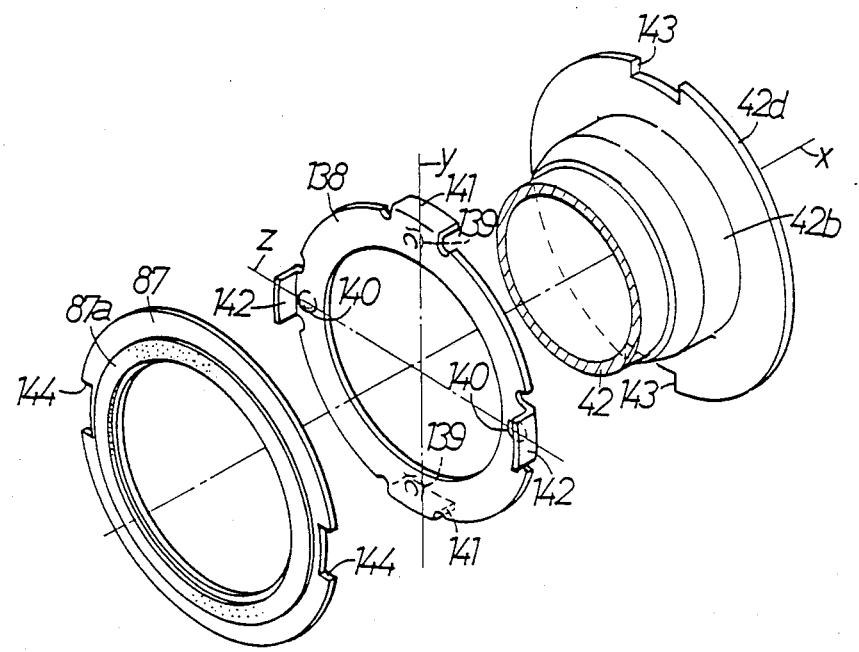
FIG. 8 is an exploded perspective view of the center adjust plate and its associated members.

The center adjust plate 138, as shown in FIG. 8, has at one side a pair of first fulcrum projections 139, 139 that contact the flange 42d to enable inclination of the plate 138 about a first axis y perpendicular to the axis x of the output shaft 42. On the other side of the center adjust plate 138 there is a pair of second fulcrum projections 140, 140 in abutment with the friction clutch plate 87 to allow the plate 138 to tilt about the second axis z, that is perpendicular to both the output shaft axis x and the first axis y. On its outer circumference the center adjust plate 138 has a pair of first transmission claws 141, 141 formed adjacent to the first fulcrum projections 139, 139 and projecting toward the flange 42d. Adjacent the second fulcrum projections 140, 140, there is also a pair of second transmission claws 142, 142 projecting oppositely toward the friction clutch plate 87. The first transmission claws 141, 141 engage with a pair of notches 143, 143 formed at the outer circumference of the flange 42d, while the second transmission claws 142, 142 engage with a pair of notches 144, 144 formed at the outer circumference of the friction clutch plate 87. The center adjust plate 138 thus operates to bring the flange 42d and the friction clutch plate 87 into engagement in the direction of rotation. Between the transmission claws 141, 142 and the corresponding notches 143, 144 there are provided small gaps or clearance spaces of sufficient extent to permit tilting of the center adjust plate 138 about the first and second axes y, z.

The flywheel 72 has a boss 72a projecting toward the side opposite the cam mechanism 73. Fitted inside the inner circumference of the boss 72a through a release bearing formed of radial ball bearing 88 is a pressure ring 89 that is used to operate the output lever mechanism 74. The pressure ring 89 is also disposed so as not to contact the output shaft 42.

The output lever mechanism 74 includes a supporting shaft 90 and a lever 91. The shaft 90 projects into the inner end surface of the outer case 22b between the axle 10 and the pressure discharge valve 30, and the lever 91 is supported on the neck portion 90a at the forward end of the shaft 90 in such a way that the lever 90 can oscillate in the axial direction of the axle 10. As shown in FIGS. 2 and 4, the lever 91 comprises a long first arm 91a extending from the shaft 90 in spaced relation from the output shaft 42. A short second arm 91b extends oppositely from the shaft 90 toward the pressure discharge valve 20. At an intermediate portion of the first arm 91a, a projection 93 is raised to abut against the outer side surface of the pressure ring 89.

Between the forward end of the first arm 91a and the outer case 22b, a return spring 94 is compressed and the second arm 91b is disposed so as to press the outer end of the valve risk 67 of the pressure discharge valve 20.

The resilient force of the return spring 94 acts upon the lever 91 to press the projection 93 of the first arm 91a against the pressure ring 89 and, under normal conditions, keeps the valve disk 67 of the pressure discharge valve 20 closed. The pressing force the pressure ring 89 receives from the return spring 94 acts on the flywheel 72, cam mechanism 73, friction clutch plate 87 and the center adjust plate 138, and presses these against the flange 42d. As a result, the cam plates 82, 83 are applied with a force tending to bring them closer together. Consequently, the friction clutch plate 87 and the drive cam plate 82 are applied with a friction engagement force.

The friction engagement force is s set that the friction clutch plate 87 begins to slip when a predetermined rotating torque, exceeding a certain value, is applied between the friction clutch plate 87 and the flywheel 72.

To prevent the return spring 94 from inclining from its proper position and to restrict the oscillating path of the lever 91, a guide rod 85 passing through the return spring 94 and the lever 91 is secured to the outer case 22b.

The shaft 90 is made adjustable to provide an adequate gap g between the lever 91 and the fulcrum point of the shaft 90, or the base of the neck portion 90a, so as to keep the engagement projection 93 of the lever 91 pressed against the pressure ring 89 and to also keep the pressure discharge valve 20 closed by the second arm 91b. Accordingly, the shaft 90 has a threaded portion 90b screwed into the side wall of the outer case 22b and projecting outward from the case 22b. A lock nut 92 is screwed on the outer end of the threaded portion 90b. Thus, by loosening the lock nut 92 and rotating the threaded portion 90b, the effective length of the shaft 90 can be changed and therefore the fulcrum position of the shaft 90 with respect to the lever 91 can be adjusted. After adjustment is made, fastening the lock nut 92 will secure the shaft 90 to the outer case 22b.

The threaded portion 90b and the lock nut 92 are exposed outside the casing 22 to facilitate adjustment or maintenance by use of an appropriate tool. The lock nut 92 is circular in shape and cut at the end surface with a tool-engaging slot 95 which can be engaged by a special screwdriver that is not interfered with by the outer end of the threaded portion 90b. The tool lot 96 on the threaded portion 90b may be a common one to which a conventional screwdriver can fit.

The shaft 90 is fitted with an O-ring at a portion passing through the outer case 22b to seal the case 22b.

The operation of the described organization is as follows. In assembling the anti-lock controller 7 to the front wheel 2f, one end of the cylindrical hollow shaft 24 is inserted into the outer case 22b in which the hydraulic pump 16, modulator 17, pressure discharge valve 20, output lever mechanism 74 and planetary gears $78_1$, $78_2$ are assembled. Then, the output shaft 42, fitted with the sun gear 79, is mounted over the cylindrical hollow shaft 24, following which the flywheel 72, cam mechanism 73, friction clutch plate 87 and the center adjust plate 138 are assembled onto the output shaft 42. The input member 75 is then mounted on the other end of the cylindrical hollow shaft 24. Following this, the inner case 22a is screwed to the outer case 22b, and the joint plate 135 of joint 128 is joined to the input member 75. In this way, the anti-lock controller 7 is assembled into a unit, independent of the front wheel 2f.

Next, the cylindrical hollow shaft 24 of the anti-lock controller 7 is fitted to the axle 10 that supports the hub 8 of the front wheel 2f. When the anti-lock controller 7 is installed in the recess 8a of the hub 8, the engagement holes 126 of the joint plate 125 and the joint pins 127 of the hub 8 immediately engage each other. After this, both ends of the axle 10 are secured to the lower ends of the front fork 9 by the holder 121 and bolts and nuts.

In this way, the anti-lock controller 7 is easily assembled and mounted to the front wheel 2f. It should also be noted that the axle 10 firmly supports the casing 22 and that the hub 8 compactly accommodates the major part of the anti-lock controller 7.

While the vehicle is running, the rotation of the front wheel 2f is transmitted to the input member 75 from the hub 8 through the joint 128. The rotation is further transmitted to the output shaft 42 during periods of acceleration by the planetary ring gear 76, first and second planetary gears $78_1$, $78_2$ and sun gear 79. The increased rotating motion is then transmitted from the flange 42d through the first transmission claw 141, center adjust plate 138, second transmission claw 142, friction clutch plate 87 and cam mechanism 73 to the flywheel 72. Hence, the flywheel 72 rotates at a velocity greater than that of the front wheel 2f, and, consequently, has a large rotating inertia. If the pressure ring 89 and the lever 91 are in contact with each other, the release bearing 88 permits the rotation of the flywheel 72 without interference by the lever 91.

At the same time, the cam shaft 26 and the speed meter 51 are also driven by the first planetary gear $78_1$.

During the driving operation, if the input member 75 is overloaded for some reason, the joint pins 127 of the joint 128 are sheared interrupting the transmission from the hub 8 to the input member 75, and thereby preventing the overload from acting upon the speed increasing device 45 and the sensor 21.

When the front master cylinder 5f is operated to brake the front wheel 2f, the output oil pressure from the master cylinder 5f is transmitted to the upstream pipe 15a of the oil pipe 15, oil chamber 36 of the hydraulic pump 16 and to the input oil chamber 54, valve chamber 58, valve hole 59 and output oil chamber 55 of the modulator 17. The oil pressure is further transmitted through the downstream pipe 15b of the oil pipe 15 to the front brakes 3f, 3f applying braking power to the front wheel.

In the hydraulic pump 16, as the output oil pressure of the front master cylinder 5f is introduced into the oil chamber 36, the pressing action on the working piston 29 by the oil pressure and the lifting action by the eccentric cam 26a upon the push rod 27 combine to cause the pump piston 28 to reciprocate. In the suction stroke, where the pump piston 28 moves toward the push rod 27, the suction valve 38 is opened introducing the oil from the oil reservoir 19 through the oil pipe 37 and inlet chamber 31 into the pump chamber 35. In the delivery stroke, where the pump piston 28 moves toward to working piston 29, the one-way sealing member 39 is opened delivering the oil in the pump chamber 35 to the outlet chamber 32 and through the oil path 57 to the control oil chamber 18 of the modulator 17. When the pressure in the outlet chamber 32 and the control oil chamber 18 increases to a specified value, the pump piston 28 is kept in contact with the plug member 34 by the pressure in the outlet chamber 32.

The control oil chamber 18 of the modulator 17 is initially cut off from communication with the oil reservoir 19 by the closed discharge valve 20. Accordingly, the oil pressure supplied to the control oil chamber 18 from the hydraulic pump 16 acts directly upon the pressure reducing piston 46 to urge it to the retracted position keeping the valve disk 60 open by the valve opening rod 62, allowing the output oil pressure from the front mastercylinder 5f to pass through. Therefore, under the normal braking conditions, the force applied to the front wheel brakes 3f, 3f is proportional to the output oil presure of the front master cylinder 5f.

As angular deceleration of the front wheel 2f occurs in response to this braking action, the flywheel 72 that has sensed the deceleration tends to overrun with respect to the output shaft 42 by inertia. The rotating moment of the flywheel 72 at this time causes a relative rotation between the cam plates 82 and 83, so that the flywheel 72 is axially displaced to press the pressure ring 89 against the lever 91 by the thrust force caused by movement of the thrust balls 84.

At stages where there is no possibility of the front wheel 2f getting locked, the angular deceleration of the front wheel 2f is not sufficiently great to oscillate the lever 91. However, when the front wheel 2f, due to excess braking action, or reduction in the friction coefficient of the road surface, approaches a locking condition, the resultant rapid increase in the angular deceleration of the front wheel 2f causes the thrust force produced by the cam mechanism 73 to exceed the setting load of the return spring 94 increasing the axial displacement of the flywheel 72. Since the flywheel 72, as described earlier, is supported with respect to the output shaft 42 in a no-contact condition by means of the cam mechanism 73, it is free from friction resistance by the output shaft 42 and therefore able to respond accurately to the rapid increase in the thrust force of the cam mechanism 73.

As the axial displacement of the flywheel 72 increases, the lever 91 closes the gap "g" between it and the shaft 90 and oscillates about the shaft 90 as a fulcrum to compress the return spring 94. Therefore, the second arm 91b of the lever 91 moves away from the valve disk 67 to open the pressure discharge valve 20.

After axial displacement of the flywheel 72, when the rotating torque by the inertia of the flywheel 72 exceeds a specified transmission torque of the friction clutch plate 87, a slip occurs between the center adjust plate 138, the drive cam plate 82 and the friction clutch plate 87 allowing the flywheel 72 to continue overrunning with respect to the output shaft 42 to prevent the cam mechanism 73 from being overloaded.

When a thrust is produced during relative rotation between the drive and follower cam plates 82, 83, if an unbalanced load acts between these cam plates 82, 83 due to matching errors in the cam recessed portions 82a, 83a and in the thrust balls 84, three members—the drive cam plate 82, friction clutch plate 87 and center adjust plate 138—are together tilted about the first axis y which passes through the fulcrum defined by the contacting points between the first fulcrum projections 139, 139 of the center adjust plate 138 and the flange 42d of the output shaft 42. Alternatively, two members—the drive cam plate 82 and the friction clutch plate 87—may be together tilted about the second axis z which passes through the fulcrum defined by the contacting points between the second fulcrum projections 140, 140 of the center adjust plate 138 and the friction clutch plate 87. These tilting actions about two axes can immediately correct the unbalanced load into the proper thrust acting in the axis x of the output shaft 42. As a result, the frictional engagement force between the friction clutch plate 87 and the drive cam plate 82 can be made uniform over the entire contacting surface, providing a stable slip characteristic of the friction clutch 87.

When the pressure discharge valve 20 opens, the oil pressure in the control oil chamber 18 is discharged through the oil path 70, inlet chamber 68, valve hole 66, outlet chamber 69, oil path 71, inlet chamber 31 of the hydraulic pump 16 and pipe 37 into the oil reservoir 19. This causes the pressure reducing piston 36 to move, by the pressure of the output oil chamber 55, toward the control oil chamber 18 against the force of the return spring 48. This, in turn, retracts the valve opening rod 62 to close the valve disk 60 and thereby interrupt the communication between the input and output oil chambers 54 and 55. At the same time the volume of the output oil chamber 55 increases. As a result, the braking oil pressure applied to the front wheel brakes 3f 3f decreases, reducing the braking force on the front wheel 2f and thereby avoiding locking of the front wheel. Then, as the front wheel 2f accelerates, the pressing force on the lever 91 from the pressure ring 89 is released and the lever 91 oscillates back to the initial position by the force of the return spring 94, closing the discharge valve 20. With the discharge valve 20 closed, the oil delivered from the hydraulic pump 16 is immediately contained in the control oil chamber 18, and the pressure reducing piston 46 is retracted toward the output oil chamber 55 increasing the pressure in that chamber 55 and, therefore, recovering the braking force. Such actions are repeated at high speeds to permit effective control of the braking of the front wheel 2f.

It will be appreciated that the described cam mechanism comprises a drive cam plate rotatably mounted on the output shaft and driven by it through a clutch means; a follower cam plate formed integral with the flywheel and disposed opposite to the drive cam plate; and a plurality of circumferentially spaced thrust balls adapted to engage with tapered cam grooves formed in the opposing surfaces of the cam plates and effective to support the follower cam plate in the thrust and radial directions. The cam mechanism supports the flywheel about the output shaft in such manner that there is no contact between the flywheel and the output shaft. Consequently, the flywheel is free from friction resistance by contact with the output shaft and, therefore, requires no lubrication. This results in substantial improvement in the response by the flywheel to the thrust force of the cam mechanism, enabling rapid and accurate generation of braking control signals.

It should be further understood that, although a preferred embodiment of the invention has been illustrated and described herein, changes and modifications can be made in the described arrangement without departing from the scope of the appended claims.

We claim:

1. A wheel angular acceleration sensor for a vehicle wheel braking anti-lock controller, comprising:
   wheel braking means;
   an output shaft having an axis and rotatable with a wheel that is braked;
   a flywheel disposed around said output shaft with a spacing therebetween so as to be rotatable around and movable along the axis of the output shaft;
   clutch means for transmitting driving torque from said output shaft to said flywheel under normal operating conditions and permitting relative angular movement between said flywheel and said output shaft during periods of wheel deceleration due to braking;
   a cam mechanism operative to move said flywheel axially of said output shaft in response to relative movement therebetween; and
   means responsive to said flywheel axial movement for controlling said wheel braking means; and
   wherein said cam mechanism includes:
   a drive plate rotated by said output shaft; and
   a follower plate fixed for rotation to said flywheel; said drive and follower plates having surfaces opposed to each other and said drive plate supporting said flywheel via said follower plate in concentric relation with said output shaft with a radial spacing provided between said drive plate and said flywheel.

2. The organization according to claim 1 wherein said surfaces of the drive and follower plates are tapered to have diameters thereof increased in a direction apart from said flywheel.

3. The organization according to claim 1 wherein said cam mechanism further includes means for connecting said plates upon relative rotation between said flywheel and said output shaft.

4. The organization according to claim 3 wherein said connecting means comprises a plurality of recesses between said cam plates, and a ball in each said recess operative to support said flywheel with respect to said output shaft.

5. The organization according to claim 4 wherein said recesses are disposed on circumferential spacing about said output shaft.

6. The organization according to claim 4 including mutually opposed recesses in each of said drive plate and said follower plate, said recesses being tapered to cooperate with said ball to effect relative axial movement upon the occurrence of relative angular movement therebetween.

7. The organization according to claim 6 wherein said follower plate is integrally formed on said flywheel.

8. The organization according to claim 3 wherein said wheel braking means is hydraulically operated; and including means responsive to axial movement of said flywheel for controlling the hydraulic braking force applied to said wheel.

9. The organization according to claim 8 wherein said wheel braking means includes a hydraulic system, a pressure relief valve in said system operative, upon actuation, to release braking pressure from said wheel; and means for operating said pressure relief valve in response to axial movement of said flywheel along said output shaft.

10. The organization according to claim 9 wherein said pressure relief valve operating means includes a lever having a first arm operatively connected to said flywheel; a second arm operatively connected to said pressure relief valve; and means forming a fulcrum intermediate said first arm and second arm.

11. The organization according to claim 10 including a return spring for biasing said lever in a direction to normally close said pressure relief valve.

12. The organization according to claim 11 wherein said lever is normally longitudinally spaced from said fulcrum.

13. The organization according to claim 12 wherein the position of said fulcrum is adjustable.

14. The organization according to claim 1 or 2 wherein said flywheel is rotatable on a pressure ring which is disposed so as not to contact the output shaft and which is associated with said flywheel axial movement responsive means.

* * * * *

UNITED STATES PATENT AND TRADEMARK OFFICE
CERTIFICATE OF CORRECTION

PATENT NO. : 4,815,570

DATED : March 28, 1989

INVENTOR(S) : TETSUO TSUCHIDA et al.

It is certified that error appears in the above-identified patent and that said Letters Patent is hereby corrected as shown below:

In column 11, line 26, after "and" insert -- for --.

In column 11, line 31, after "relative" insert -- angular --.

Signed and Sealed this

Fifth Day of December, 1989

Attest:

JEFFREY M. SAMUELS

Attesting Officer — Acting Commissioner of Patents and Trademarks